A. E. CADMAN.
AUTOMOBILE TRAILER.
APPLICATION FILED JAN. 7, 1915.
1,190,237.
Patented July 4, 1916.
2 SHEETS—SHEET 1.
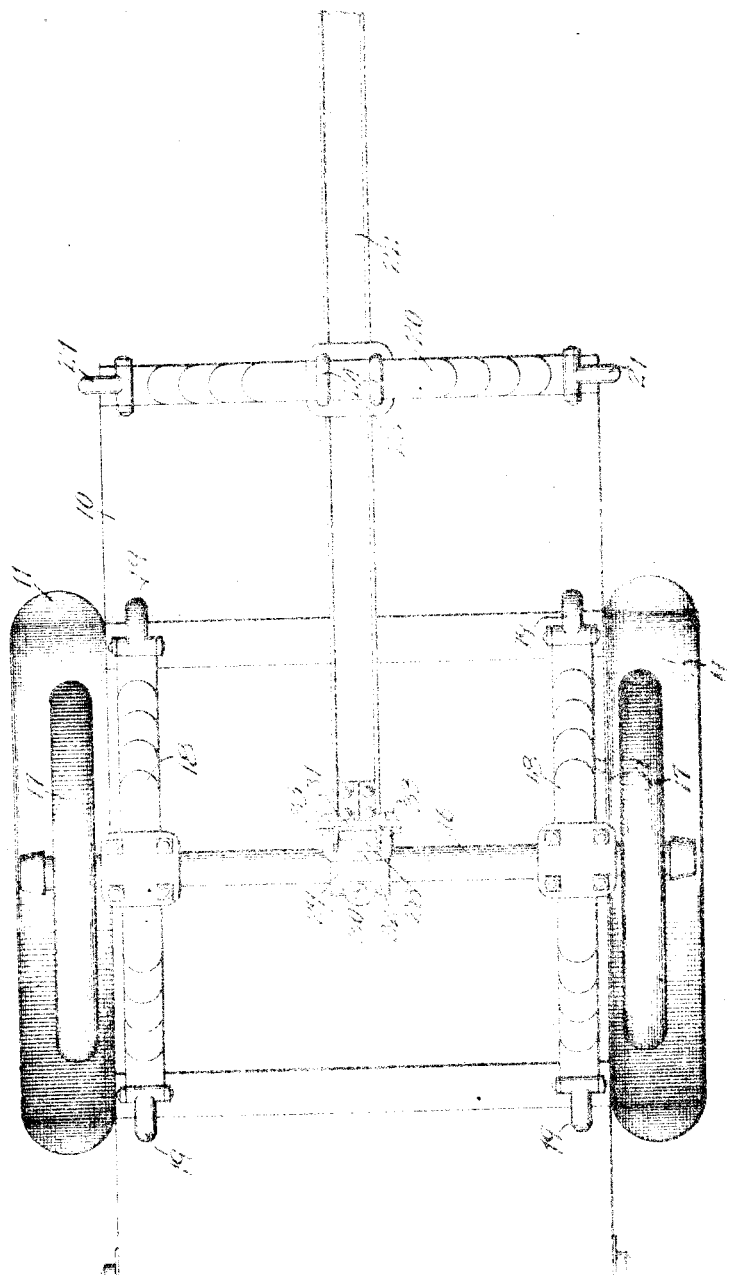

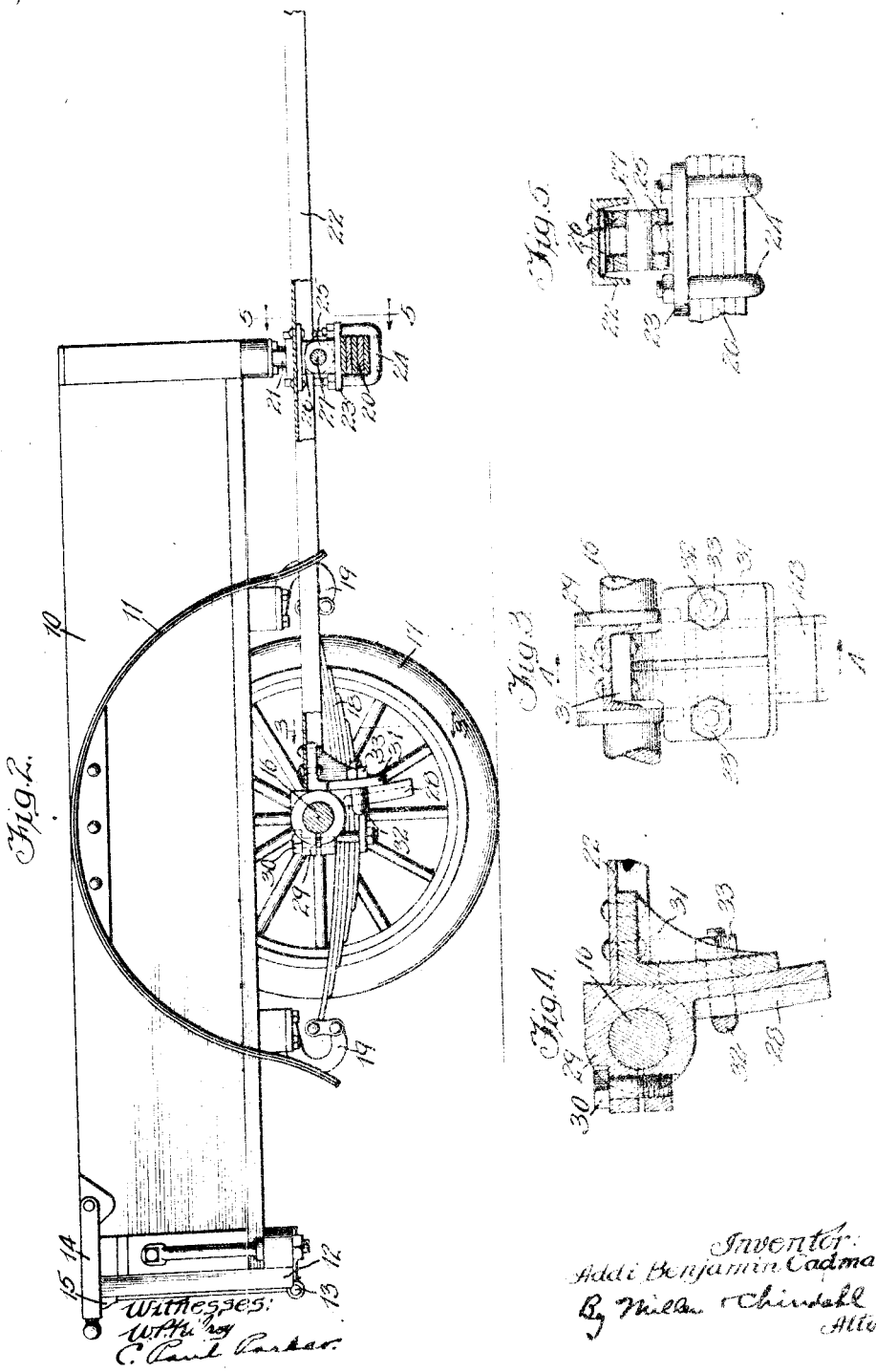

UNITED STATES PATENT OFFICE.

ADDI BENJAMIN CADMAN, OF BELOIT, WISCONSIN, ASSIGNOR TO WARNER MANUFACTURING COMPANY, OF BELOIT, WISCONSIN, A CORPORATION OF ILLINOIS.

AUTOMOBILE-TRAILER.

1,190,237. Specification of Letters Patent. Patented July 4, 1916.

Application filed January 7, 1916. Serial No. 70,725.

*To all whom it may concern:*

Be it known that I, ADDI BENJAMIN CADMAN, a citizen of the United States, residing at Beloit, in the county of Rock and State of Wisconsin, have invented certain new and useful Improvements in Automobile-Trailers, of which the following is a specification.

This invention relates to a trailer cart adapted to be hitched on to a suitable part, preferably the rear axle, of an automobile for carrying a load of freight or the like.

In different makes of automobiles the height of the rear axle from the ground varies, and therefore the angle at which the tongue of the trailer extends will depend upon the particular automobile to which it is attached.

It is one of the objects of the present invention to provide a trailer in which the angular relation between the tongue and the body may be adjusted so that the tongue may be attached to different makes of automobiles and the proper adjustments may be made to maintain the body level.

The invention also refers to the manner of supporting or mounting the body of the trailer and to certain details of construction as will be understood from the following description.

In the accompanying drawings, Figure 1 is a bottom plan view of an automobile trailer embodying the features of my invention, the forward portion of the tongue being broken off. Fig. 2 is a side elevation of the trailer with parts in section, only a portion of the tongue being shown. Fig. 3 is an enlarged detail section taken in the plane of line 3—3 of Fig. 2. Fig. 4 is a vertical section on line 4—4 of Fig. 3. Fig. 5 is a sectional detail in the plane of line 5—5 of Fig. 2.

The body 10 of the cart may be of any common or preferred construction, preferably being provided with fenders 11 and having a movable end gate 12 pivoted at its lower edge at 13 and arranged to be tightly locked to prevent rattling by means of levers 14 pivoted to opposite sides of the body and engaging cam blocks 15 on the end gate.

The body is centrally supported upon an axle 16 having wheels 17 thereon by means which preferably comprise two springs 18 secured to the axle adjacent to said wheels and extending longitudinally of the body, the latter having suitable brackets 19 attached to the ends of said springs. The forward end of the body is supported in this instance by a transverse spring 20 having its ends attached to brackets 21 on the body, the mid-portion of said spring being secured to the tongue 22 by which the cart is drawn. In practice, the forward end of the tongue will be provided with a universal joint or coupling device (not shown) for attachment to the rear axle of an automobile. The rear end of the tongue is preferably secured to the axle 16 of the cart.

In order that the body 10 may be maintained level in spite of an angular position of the tongue when attached for use, means is provided for adjusting the angular relation of the tongue and the body. The adjustment may be made at the rear end of the tongue, or at the point of connection between the forward end of the body and the tongue. In the present instance, the adjustment is made at the rear end of the tongue, and to accommodate such adjustment a pivotal connection is provided between the forward end of the body and the tongue. This pivotal connection may be of various forms, that herein shown comprising a plate 23 secured to the spring 20 by U-bolts 24 and having an apertured lug 25 which overlaps and lies between two ears 26 secured to the tongue 22, said lug and ears being pivotally connected by a suitable pivot pin 27 to permit vertical rocking movement of the tongue.

The means for adjusting the tongue comprises, in the preferred form, a bracket 28 having a split bearing portion 29 which is adapted to be clamped rigidly to the axle 16 by means of a bolt 30 engaging ears at opposite sides of the slot in the bearing 29, and a bracket 31 rigidly fixed to and depending from the rear end of the tongue 22, said brackets having arcuate faces to abut against each other, the faces being struck on an arc with the pin 27 as a center. Means is provided for clamping the brackets 28 and 31 rigidly together in different positions, said means preferably comprising a U-bolt 32 embracing the depending portion of the bracket 28 and having its branches passing through apertures in the bracket 31 and provided with clamping nuts 33 to bear against the latter.

In use, if it is necessary to adjust the trailer to the automobile with which it is to be used, the nuts 33 are loosened, the tongue is set at the proper angle to be coupled to the automobile, the body being maintained in a true horizontal position, and the nuts 33 are then tightened to rigidly clamp the brackets 28 and 31 together.

The specific details of the preferred embodiment of my invention have been herein described, but without any intention of limiting the invention to the form disclosed, since various modifications and equivalents are possible. The scope of the invention is pointed out in the appended claims.

I claim as my invention:

1. An automobile trailer having, in combination, a body, an axle provided with two supporting wheels, two springs extending longitudinally of the body and rigidly secured between their ends to said axle, the ends of said springs being connected to the body for supporting the latter, a third spring extending transversely beneath the forward end of the body and having its ends connected to the body, a tongue extending beneath the body, means connecting said tongue to the midportion of said third spring and allowing the tongue to rock on a horizontal axis, a bracket fixed to the rear end of said tongue, another bracket fixed to the central part of said axle, said brackets having abutting faces struck on an arc with said horizontal axis as a center, and bolt-and-nut means for rigidly clamping said brackets together in different adjusted positions, whereby the angular relation between the tongue and the body may be varied.

2. An automobile trailer having, in combination, an axle provided with two supporting wheels, a body supported between its ends on said axle, a tongue extending beneath the body, a pivotal connection between the tongue and the forward portion of the body permitting the tongue to rock on a horizontal axis, a bracket fixed to the rear end of the tongue, another bracket fixed to the axle, said brackets having abutting arcuate faces struck with said horizontal axis as a center, and means for rigidly securing the abutting faces of said brackets together in adjusted relations to vary the angle between the tongue and the body.

3. An automobile trailer having, in combination, an axle provided with two supporting wheels, a tongue extending centrally beneath the body, a pivotal connection between the tongue and the forward portion of the body permitting the tongue to rock on a horizontal axis, a bracket fixed to the rear end of the tongue and having its rearmost face of arcuate form, another bracket fixed to the axle and having its foremost face of arcuate form, said arcuate faces abutting and being concentric with said horizontal axis, and means for rigidly clamping the abutting arcuate faces of said brackets together in adjusted relation to vary the angle between the tongue and the body.

4. An automobile trailer having, in combination, a body, an axle provided with two supporting wheels, two springs extending longitudinally of the body and rigidly secured between their ends to said axle, the ends of said springs being connected to the body for supporting the latter, a third spring extending transversely beneath the forward portion of the body and having its ends connected to the body, and a tongue extending centrally beneath the body and secured at its rear end to said axle, the tongue being also secured to the mid-portion of said transverse spring, whereby the forward end of the body is supported by the tongue.

In testimony whereof, I hereunto set my hand.

ADDI BENJAMIN CADMAN.

In the presence of—
 MADELEINE WOLL,
 IDA I. WARD.